(12) United States Patent
Baylor et al.

(10) Patent No.: US 7,700,143 B2
(45) Date of Patent: Apr. 20, 2010

(54) METHOD FOR MAKING A STABLE STACKED SNACK FOOD CONFIGURATION

(75) Inventors: Darin James Baylor, Frisco, TX (US); Edward Anthony Bezek, Frisco, TX (US); Frank Mathew Brenkus, McKinney, TX (US); Kevin Matthew Trick, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1013 days.

(21) Appl. No.: 11/052,431

(22) Filed: Feb. 7, 2005

(65) Prior Publication Data

US 2006/0177552 A1 Aug. 10, 2006

(51) Int. Cl.
*A23P 1/10* (2006.01)

(52) U.S. Cl. ...................... 426/512; 426/523

(58) Field of Classification Search ........... 426/512, 426/517, 523, 438; D1/122–124, 125, 128
See application file for complete search history.

(56) References Cited

U.S. PATENT DOCUMENTS

| | | | | |
|---|---|---|---|---|
| D210,991 S | * | 5/1968 | Oelke et al. ............... | D1/123 |
| D213,946 S | * | 4/1969 | Cooper et al. ............. | D1/123 |
| 3,498,708 A | | 3/1970 | Baur et al. | |
| D219,003 S | * | 10/1970 | Harwood et al. .......... | D1/123 |
| D219,801 S | * | 2/1971 | Harwood et al. .......... | D1/123 |
| D222,223 S | * | 10/1971 | Topalis ..................... | D1/123 |
| 3,626,466 A | * | 12/1971 | Liepa ......................... | 99/353 |
| 3,988,875 A | | 11/1976 | Fay | |
| 4,205,091 A | * | 5/1980 | Van Horne ................. | 426/138 |
| 4,873,099 A | * | 10/1989 | Ruiz .......................... | 426/104 |
| 5,128,157 A | * | 7/1992 | Ruiz .......................... | 426/106 |
| D452,360 S | | 12/2001 | Teras | |
| 6,338,606 B1 | | 1/2002 | Bierschenk et al. | |
| 6,409,461 B1 | | 6/2002 | Bierschenk et al. | |
| 6,412,397 B1 | | 7/2002 | McNeel et al. | |
| D488,282 S | * | 4/2004 | Barry et al. ............... | D1/123 |
| 6,746,701 B2 | * | 6/2004 | Kashou et al. ............. | 426/128 |
| D493,271 S | * | 7/2004 | Bhaskar et al. ........... | D1/123 |

(Continued)

FOREIGN PATENT DOCUMENTS

WO    WO 01/84957    11/2001

OTHER PUBLICATIONS

Robert L. Ward, Segments of Circles, The Math Forum @ Drexel: Ask Dr. Math FAQ, Feb. 22, 2005, pp. 1-9, found at webpage: http://mathforum.org/dr.math/,Drexel University, USA.

*Primary Examiner*—Drew E Becker
(74) *Attorney, Agent, or Firm*—Colin P. Cahoon; Amanda K. Jenkins; Carstens & Cahoon LLP

(57) ABSTRACT

A method for making asymmetrical snack pieces that can be efficiently nested or stacked. A dough preform is mated with a mold as the preform is cooked into a snack piece. The preform takes the shape of the mold. The mold is designed such that the resultant snack piece, when resting upon a flat surface, has an apex and a base of equal height. This is achieved by making the mold such that the centroid of the snack piece lies in a plane that is parallel to a plane formed by the vertices of the snack piece. The snack pieces can then be efficiently nested or stacked.

5 Claims, 7 Drawing Sheets

U.S. PATENT DOCUMENTS

| | | | |
|---|---|---|---|
| D498,033 S * | 11/2004 | McKee et al. | D1/123 |
| D505,242 S * | 5/2005 | McKee et al. | D1/123 |
| 2002/0028273 A1 | 3/2002 | Teras et al. | |
| 2002/0034573 A1 | 3/2002 | McNeel et al. | |
| 2002/0071895 A1* | 6/2002 | Kashou et al. | 426/446 |
| 2002/0122852 A1 | 9/2002 | Zimmermann et al. | |
| 2002/0132029 A1 | 9/2002 | Teras et al. | |
| 2002/0172748 A1 | 11/2002 | Zimmerman et al. | |
| 2004/0018276 A1 | 1/2004 | Hsieh | |
| 2004/0139861 A1* | 7/2004 | Dove et al. | 99/404 |
| 2005/0260314 A1* | 11/2005 | Baker et al. | 426/496 |

\* cited by examiner

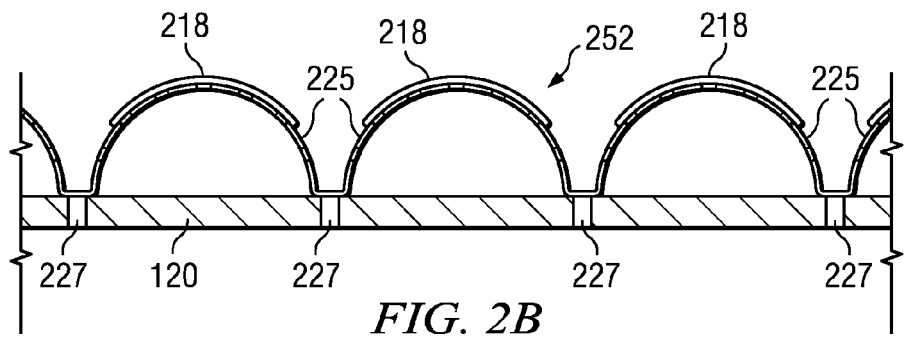
FIG. 2B
(PRIOR ART)
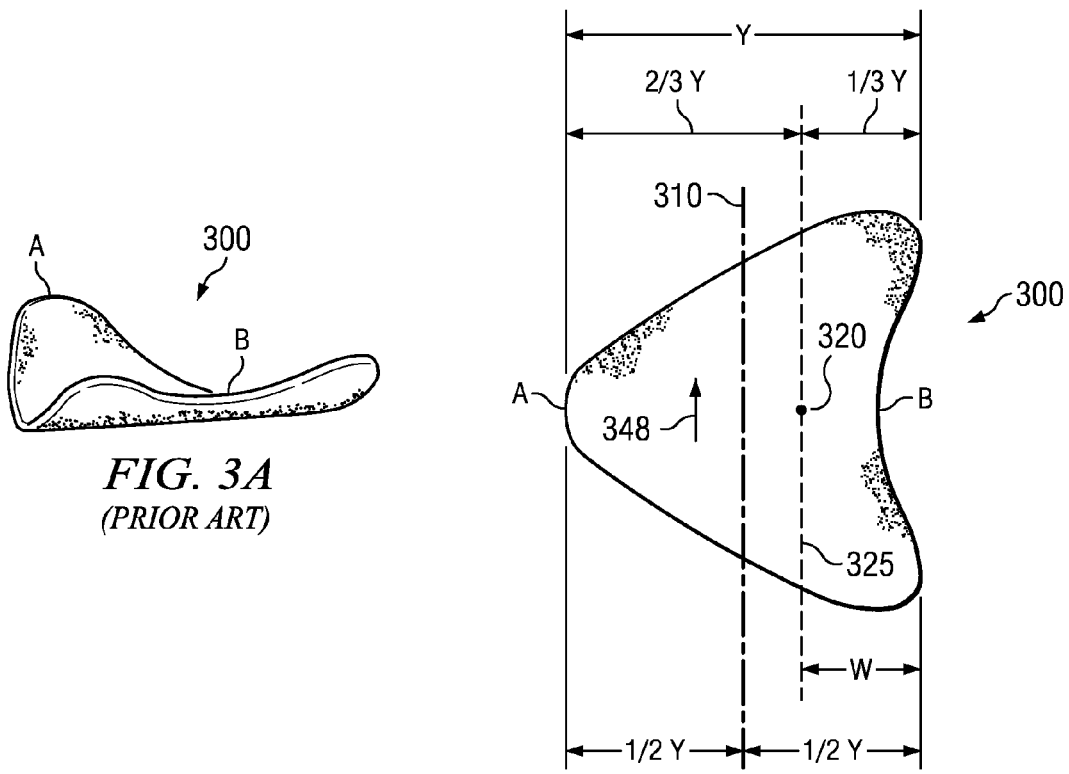
FIG. 3A
(PRIOR ART)
FIG. 3B
(PRIOR ART)
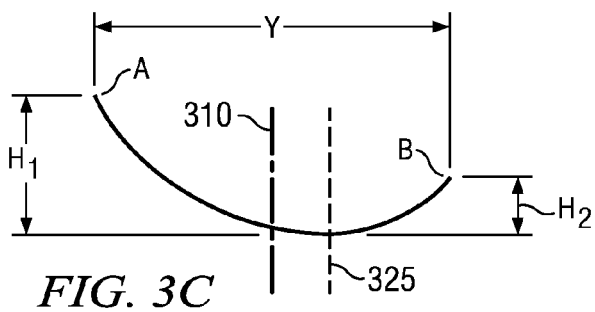
FIG. 3C
(PRIOR ART)

METHOD FOR MAKING A STABLE STACKED SNACK FOOD CONFIGURATION

BACKGROUND OF THE INVENTION

1. Technical Field

The present invention relates to a method for making a stable stacked snack food configuration and more particularly, to a method for making a stable stacked food configuration whereby the stacked snack food comprises vertices that are substantially parallel to a flat resting surface when the snack food is resting on its centroid.

2. Description of Related Art

Stacked tortilla chips are known in the art. For example, U.S. Pat. No. 6,412,397, assigned to the same assignee of the present invention, discloses a method and apparatus for making stackable tortilla chips using a double mold form fryer.

FIG. 1a is a schematic cross-sectional view of a double mold form fryer with continuous top and bottom conveyors. The fryer assembly 10 has a fryer housing 12 that contains conveyors for moving pre-forms through it. A top belt 20 is disposed in a top portion of the fryer housing 12 and is supported and rotated by two rollers 22, 24. A bottom belt 30 is disposed beneath the top belt 20. The bottom belt 30 is a continuous loop belt and is supported and rotated by two rollers 32, 34. A fryer pan 50 containing a body of oil 52 is situated within the fryer housing 12 so that at least a portion of the top and bottom belts 20, 30, when adjacent to each other, are passed through the oil 52.

For cooking, pre-forms are led towards the fryer by the bottom belt 30 starting at about the input-side roller 32. The pre-forms are then followed from above by the top belt 20 and led towards a point in the oil 52 where the bottom belt 30 comes into close proximity with the top belt 20. By at least this point, the pre-forms have made contact with at least one mold surface. While not depicted, molds are commonly placed on at least the exterior surface of the top belt 20 but may also be placed on the exterior surface of the bottom belt 30. Once the pre-forms are secured between the top and bottom belts 20, 30, which run substantially parallel to each other through the oil 52, they are introduced to the hot cooking oil 52 at an oil entry point 53. The pre-forms thereafter travel through the hot oil 52 in the oil pan 50 completely submerged until they emerge from the oil 52 at an oil exit point 55. A typical form fryer may be operated with an oil frying temperature between 240 to 400° F.

In addition to dual mold form fryers, a single mold form fryer such as one disclosed in U.S. patent application Ser. No. 10/347,993, assigned to the same assignee as the present invention can be used. FIG. 1B is a schematic cross-sectional view of a single mold form fryer with a continuous top conveyor. A fryer assembly 100 receives snack products to be fried (pre-forms) at an entrance area 102. After cooking, the snack products exit the fryer assembly 100 on an exit conveyer 140 at an exit area 104. Between the entrance area 102 and the exit area 104 is a fryer housing 112 having a port 114 for controlling the fryer environment above the cooking snack products. The top conveyer 120 of the single mold form fryer is disposed longitudinally within the fryer and is positioned above a fryer oil pan 150. Pre-forms are then delivered by a bottom entrance conveyor 130 into oil 151 within the fryer oil pan 150 for cooking. The pre-forms with proper buoyancy then rise up in the oil and dispose themselves against molding surfaces on the top conveyer 120. U.S. patent application Ser. No. 10/848,881, also assigned to the same assignee as the present invention, discloses a masa-based dough having the proper buoyancy that can be used to make tortilla chips in a single mold form fryer.

FIG. 2a is a perspective view of a prior art mold cavity conveyor assembly. FIG. 2b is a schematic cross-sectional view of the mold cavity conveyor assembly shown in FIG. 2a. As illustrated in FIG. 2a, the mold cavities 225 are formed as continuous, longitudinally extending (in terms of the running direction of the belt assembly, indicated by arrow 246), convex-shaped depressions. The mold cavities 225 are curved about longitudinally extending axes 244 but, locally, are relatively straight or non-curved in the longitudinal direction. In other words, the only longitudinal curvature is attributable to the belt flexing, and that curvature is essentially absent over the length of the portion of the belt disposed within the oil pan. The mold cavity elements can be formed from perforated, preferably electro-polished stainless steel. The perforations should be large enough to allow hot oil to reach the product to cook it and for steam to escape. The mold cavity elements 225 are fastened 227 together in side-by-side fashion and can be attached to the top conveyor 120 as shown in FIG. 1b or to both the top 20 and bottom 30 conveyors as shown in FIG. 1a. The pre-forms 218 take the shape of the mold cavity 225 as the pre-form is dehydrated in a single or double mold form fryer.

By using a form fryer, snack foods, such as potato crisps or tortilla chips, are capable of being fabricated with a standard and desirable shape. The frying of individual pieces presents numerous difficulties such as wrinkling, folding, clumping, and sticking to cooking surfaces. With the use of a form fryer, as opposed to other types of frying, a number of these difficulties can be resolved.

FIG. 3a is a perspective view of a prior art snack piece. FIG. 3b is a top plan view of a snack piece cooked in a form fryer. FIG. 3c is a side view of the snack piece shown in FIG. 3a and FIG. 3b. Referring to FIGS. 3a-3c, the snack piece 300 has a length Y perpendicular to the axis of curvature. The axis of curvature is indicated by the direction of the arrow 348. The snack piece 300 has a centerline 310 parallel to the axis of curvature located along a balance line 325, located away from the center line 310. As shown in FIG. 3c, the snack piece resting on a flat surface will naturally balance about the centroid 320. In the case of an asymmetrical shape, the centroid 320 is located away from the centerline 310. As a result, the snack piece product edge labeled as the apex A can attain a first height $H_1$, and the snack piece product edge labeled as the base B can attain a second height $H_2$, resulting in a height difference. This height difference, however, is undersirable.

FIG. 4 is a cut-away cross-sectional view of a stack of snack pieces 218, depicted in FIG. 3a-c in a snack food container 400. One problem that arises when stacking prior art asymmetrical snack pieces is that the snack pieces need to be oriented in the same direction in order to promote efficient stacking. For example, referring back to FIG. 2a, adjacent snack pre-forms 218 on each mold are oriented 180 degrees from one another. Hence, half the snack pre-forms, upon exiting the fryer must be rotated 180 degrees in order to minimize separation (e.g. void volume) between the stacked snack pieces 218 when stacked and maximize the amount of snack pieces that can be placed in a fixed volume container as shown in FIG. 4.

U.S. Pat. Nos. 6,338,606 and 6,409,461 discloses a method and apparatus for stacking tortilla chips that stacks tortilla chips oriented in the same direction. It should be noted that the orientation of the snack pieces 218 depicted in the snack food container 400 depicted in FIG. 4 are stacked such that the apex A of each chip is adjacent to the apex A of the chip above and below. Similarly, the base B of each chip is adjacent to the base B of the chip above and below to minimize separation between the snack pieces 218. It may be more economical to make asymmetrical snack pieces that could be stacked without re-orientation without reducing the amount of snack pieces (e.g. without increasing void volume) in the snack food container 400. Hence, a need exists for a method to stack asymmetrical snack pieces without a reorientation step.

As shown in FIG. 4, the outer radius 405 of a curved snack is greater the inner radius 415 due to the thickness of the snack piece. Because the inner radius 415 cannot fit around the outer radius 405, the above chip having an outer radius rests at a distance above the lower chip having the inner radius 415. This radius difference creates a separation between the stacked snack pieces 218. As previously discussed, chips not possessing equal mass on either side of the axis of curvature 310 cause the apex A to have a higher height than the base B. Thus, the orientation of this separation may not be linear as additional snack pieces are stacked. For example, although the bottom snack piece 420 is generally parallel with the bottom of the snack food container 400, the top snack piece 440 can be nearly perpendicular to the bottom of the snack food container 400. This shingling effect is a result of the cumulative height difference ($H_1-H_2$) depicted in FIG. 3c. The stacked snack piece configuration depicted in FIG. 4 can be undersirable as it leads to slack fill of the container. The shingling effect is potentially magnified through product movement that can occur during shipping and handling of the product. Further, breakage of snack pieces can more easily occur. Hence, a need exists for a method for making a stable, stacked snack piece configuration.

One prior art solution for providing a triangular snack piece that can be stacked is illustrated by U.S. Design Pat. D452,360S. Unfortunately, FIGS. 2-4 of that design patent illustrate one vertice having a height greater than the other two vertices, much like the problem disclosed above.

Another prior art solution to this problem is illustrated by U.S. Patent Application 2002/0122852. The '852 application teaches a containment well 12 having a symmetrical spherically shaped radius of curvature (see FIG. 1 of the '852 application). This configuration, however, fails to teach a method for making a stable, stacked snack piece configuration for asymmetrical snack pieces. Hence, there is a need for a method for making snack pieces that can be stably stacked upon one another. The method should permit a fried snack piece to have substantially equal height around product edges when resting upon its centroid. The method should be adaptable to various asymmetrical snack piece shapes.

SUMMARY OF THE INVENTION

The present invention provides a method for making a stackable asymmetrical snack piece that can be packaged in a nested or stacked orientation. The snack pieces are made from a mold having at least two arc lengths integral to the mold. Each arc length has a radius of curvature. Based on the desired snack piece dimensions including length and height, the arc length and radius of curvature of the mold can be calculated such that when the dough piece is registered with the mold, each vertice of the dough piece will have a substantially equal height when resting upon a flat surface after the dough piece has been cooked in the mold. The dough piece takes the form of the mold as the dough piece is cooked into a snack piece. The resultant snack piece can then be efficiently stacked.

In one aspect, the mold comprises a method for making an asymmetrical snack piece with a symmetrical mold that does not require re-orientation prior to being stacked. The above as well as additional features and advantages will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 2b is a schematic cross-sectional view of the mold cavity conveyer assembly shown in FIG. 2a.

FIG. 3a is a perspective view of a prior art snack piece.

FIG. 3b is a top plan view of a prior art snack piece.

FIG. 3c is a side elevational view of a prior art snack piece.

DETAILED DESCRIPTION

The present invention, in one embodiment, provides a method for making a snack piece such that when the snack piece is resting upon its centroid, the snack piece edges lie in a plane that is parallel to the resting surface. The present invention achieves this method by using a mold having at least two arc lengths, each arc length having a radius of curvature.

Figure 1A:
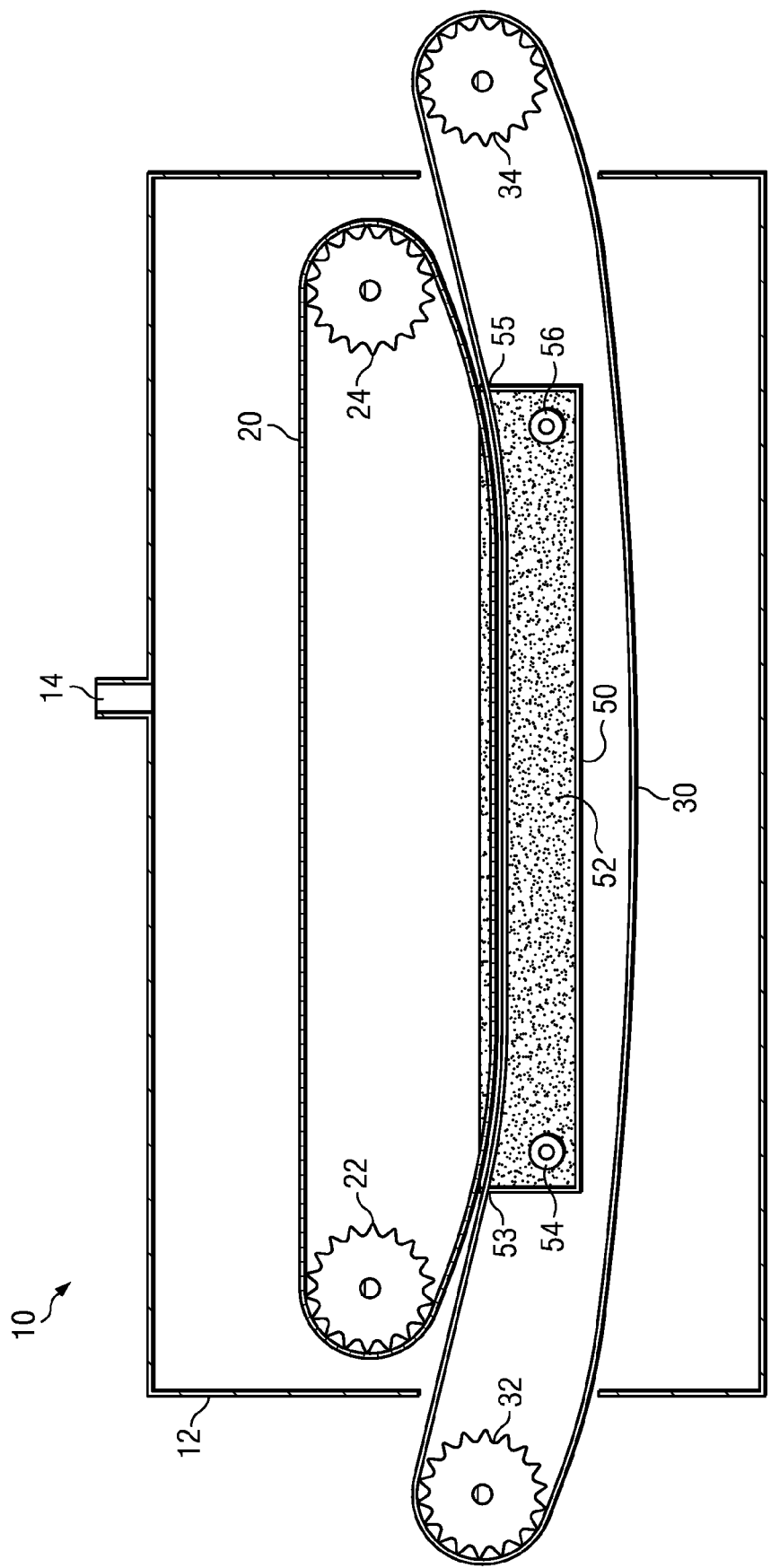
FIG. 1a is a schematic cross-sectional view of a double mold form fryer with continuous top and bottom conveyors.
Figure 1B:
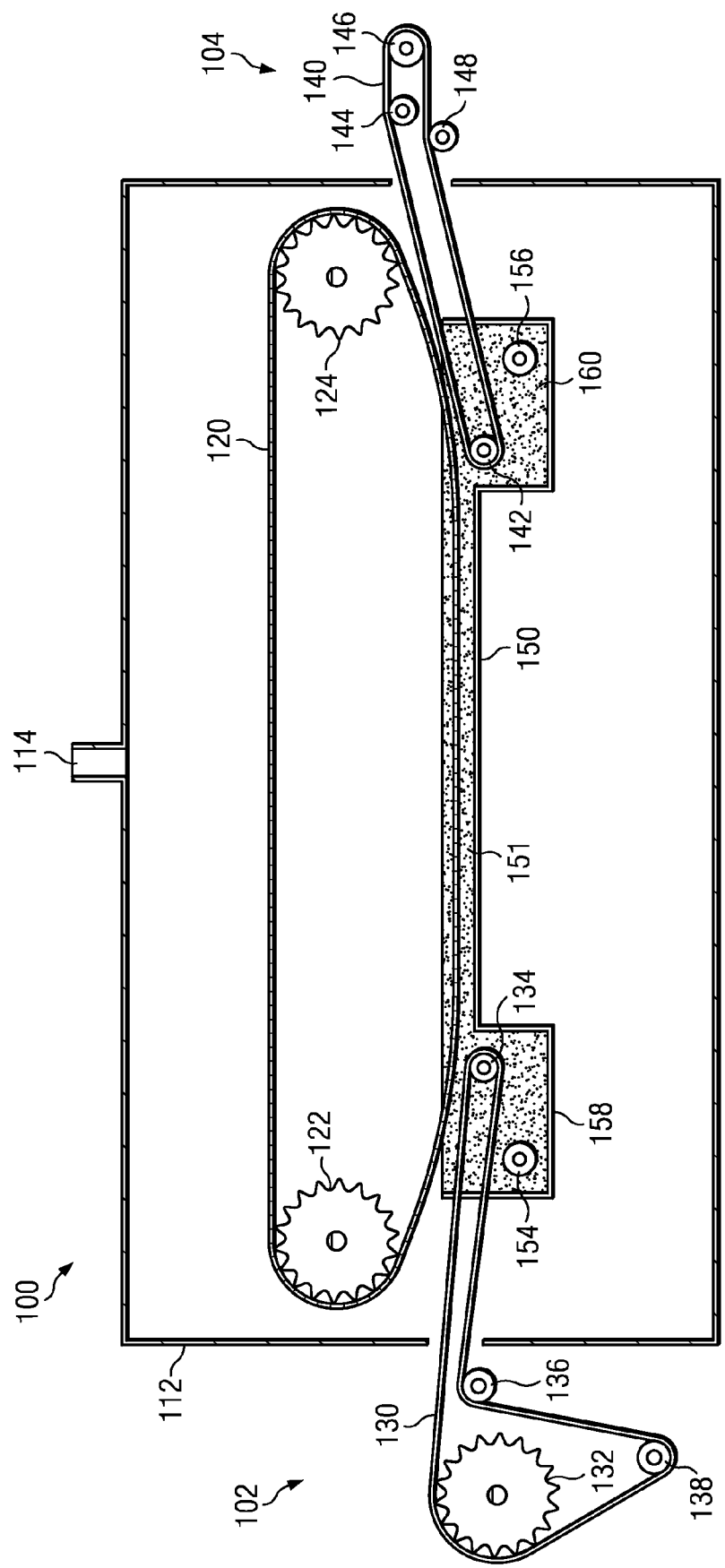
FIG. 1b is a schematic cross-sectional view of a single mold form fryer with a continuous top conveyor.
Figure 2A:
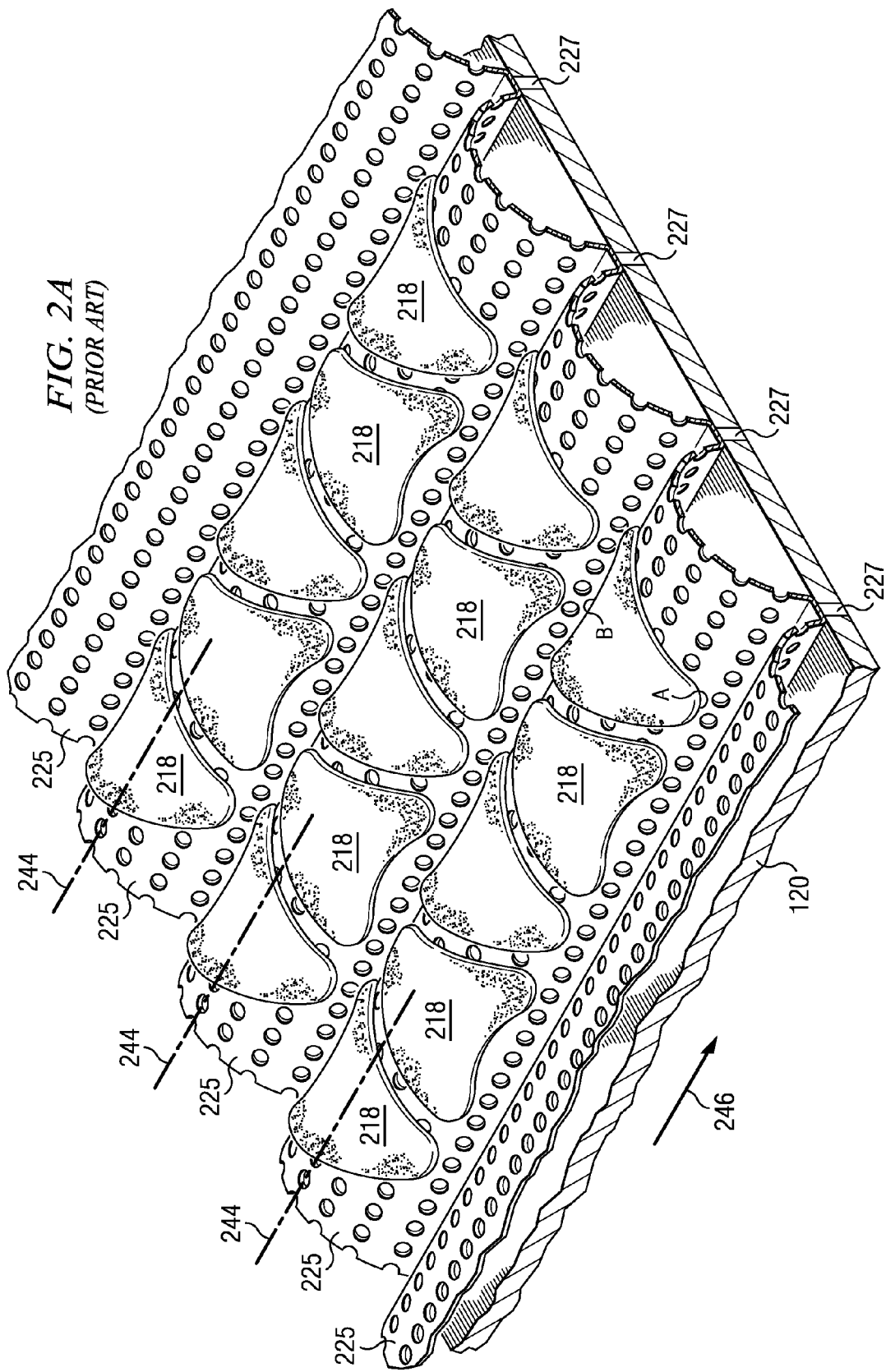
FIG. 2a is a perspective view of a prior art mold cavity conveyor assembly.
Figure 4:
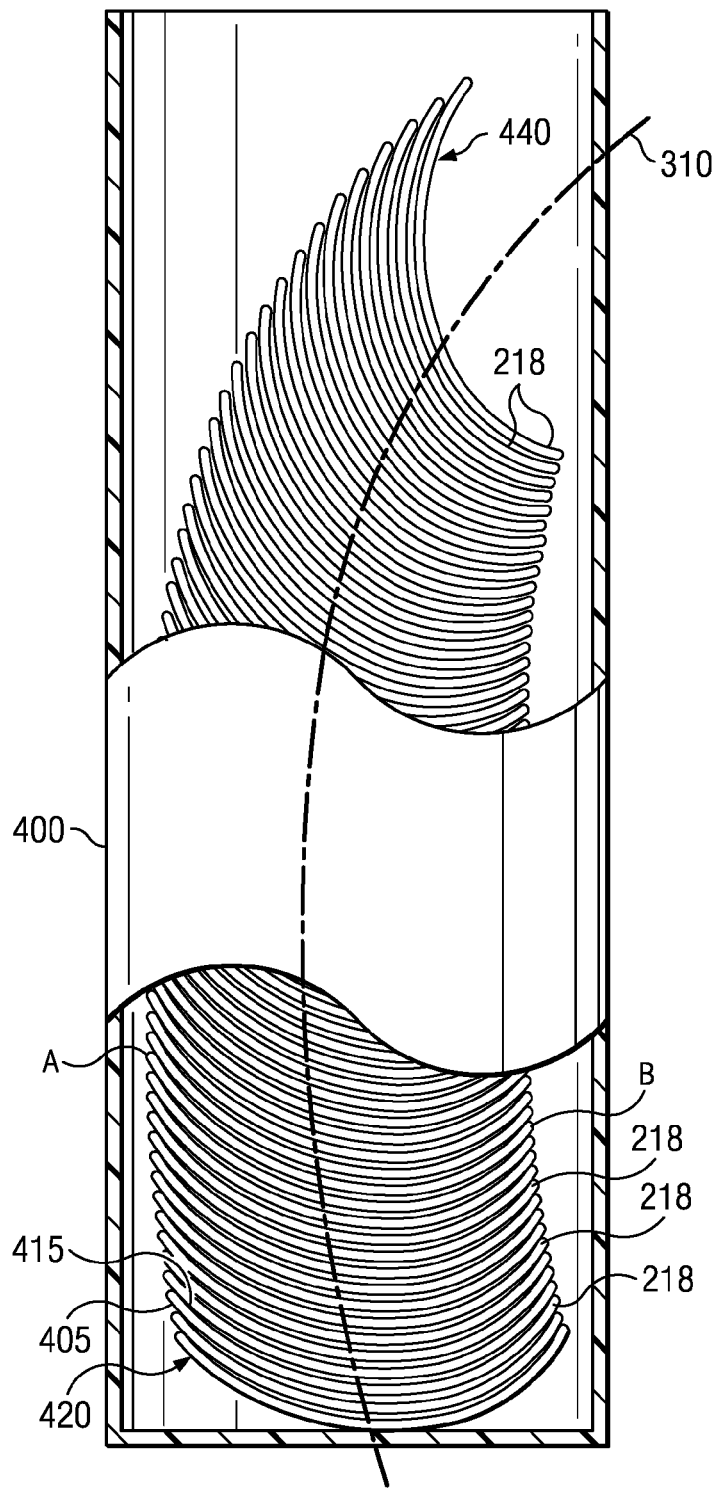
FIG. 4 is a cut-away cross-sectional view of a stack of snack pieces depicted in FIGS. 3a-c.
Figure 5A:
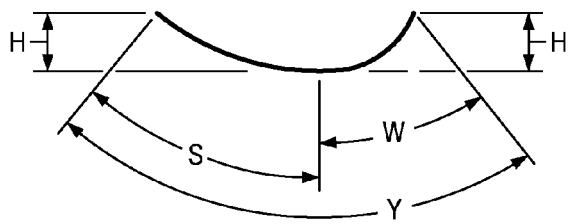
FIG. 5a is a side elevational view of an asymmetrical mold and resultant snack piece made by one embodiment of the present invention.

FIG. 5a is a side view depicting an asymmetrical mold and resultant snack piece shape according to one embodiment of the present invention. Based on the desired resultant snack piece shape dimensions, a mold can be designed. To properly design the mold, the centroid of the chip must be known. The centroid refers to the center of mass of the snack piece and is dependent upon the shape, size, and density of the snack piece. For example, the centroid of a triangle which is uniformly dense across the shape is the point of intersection of its three medians. A median is a line joining each vertex to the midpoint of the opposite side. The centroid of a more complex shape can be calculated by a computer program such as AutoCad®, available from Autodesk of San Rafael, Calif. Based on the centroid location, the minor distance W can be calculated. As used herein the minor distance W is defined as the shortest distance, perpendicular to the desired axis of curvature, from the centroid to either of the two chip edges.

Figure 5B:
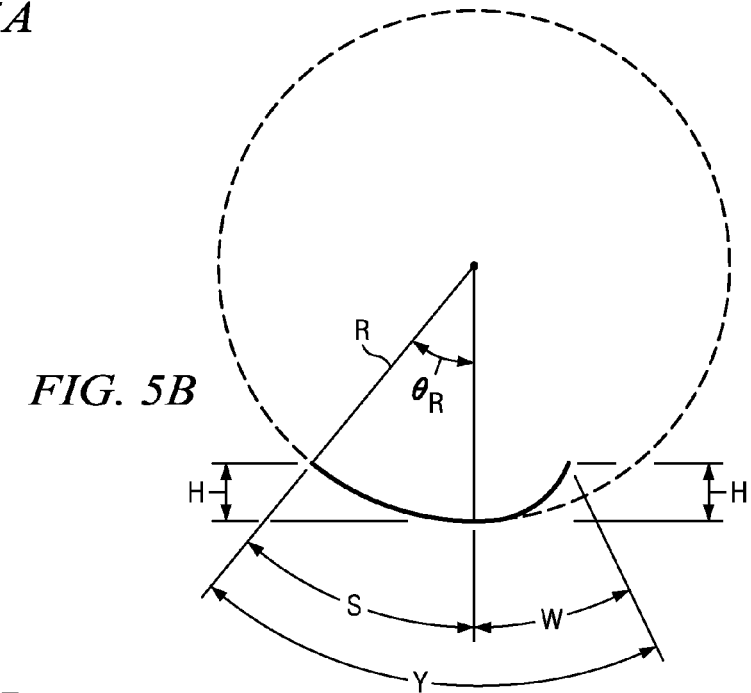
FIG. 5b is a side elevational view of a portion of FIG. 5a further depicting an angle and a radius of curvature.

FIG. 5b is a side view depicting variables used to calculate a radius of curvature R according to one embodiment of the present invention. As shown, the FIG. 5b comprises known values of desired chip height H, total chip length Y, and minor distance W. With these known values, an angle $\theta_r$ (radians) can be calculated using, for example, Newton's Method of Iteration. From the calculated angle $\theta_r$, a first radius of curvature R can be determined. The mold radius of curvature is calculated as follows:

First, the arc length S, is calculated from equation 1 below.

$$S = Y - W \quad [1]$$

Next, $\theta_r$ can be calculated with the help of Newton's Method of Iteration and equations from geometry. For example, from FIG. 5b, it is known that:

$$2*H/S = (1-\cos(x))/x \quad [2]$$

where $\theta_r = 2x$, or $$x = \theta_r/2 \quad [3]$$

For an initial guess, we can assume that:

$$k = H/S \quad [4]$$

$$x(0) = 2*k \quad [5]$$

Then, applying Newton's Method of iteration, values of x can be calculated until the desired convergence is achieved. Thus, $$x(n+1) = x(n) - \cos(x(n) + k(x(n) - 1)/(-\sin(x(n) + k) \quad [6\text{-}A]$$

Thus, for the first iteration, $$x(1) = x(0) - \cos(x(0) + k*(x(0) - 1)/(-\sin(x(0) + k) \quad [6\text{-}B]$$

Once the desired convergence for x is achieved, $\theta_r$ can be calculated from equation 3 above. Equation 3 above indicates that $\theta_r = 2x$. Thus, a mold radius of curvature R can be calculated from equation 7 below.

$$R = 2*S/r \quad [7]$$

The above formulas can be input into a spreadsheet algorithm to simplify the calculations.

The above invention will now be described with reference to an example. The example below illustrates the invention for an assymetric mold having only two radii of curvature. It should be noted that more radii of curvature will produce a more uniform mold.

Example

Figure 5C:
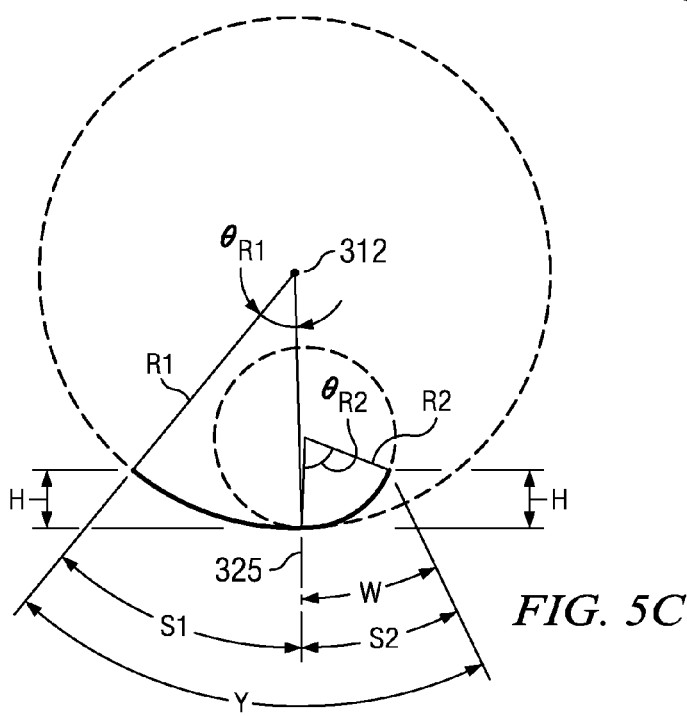
FIG. 5c is a side elevational view of a portion of FIG. 5a further depicting a first radius of curvature and a second radius of curvature.

FIG. 5c is a side elevational view of a portion of FIG. 5a further depicting a first radius of curvature and a second radius of curvature. Using a desired chip length Y of 3 inches having a desired chip height of 0.5 inches and a minor distance of 1 inch, we have the following:

Y=3 inches

W=1 inch

H=0.5 inches

From equation [1] above, we know that S1=Y−W, or that the first arc length S1 is 2 inches. Next for an initial guess for Newton's method of iteration used to first to calculate an angle, then a radius of curvature, equation [4] indicates that k=H/S1 or that k=0.5/2 or that k=0.25. Equation [5] indicates that x(0)=2*k, or 0.50. Applying Newton's method of iteration to equation 6 above results in the following:

$$x(1) = (0.5) - (\cos(0.5) + 0.25*0.5 - 1)/(-\sin(0.5) + 0.25),$$
which reduces to $$x(1) = 0.511257$$

By similar methods, the following table can be calculated:

$x(2) = 0.511025$ $x(3) = 0.511025$ $x(4) = 0.511025$

Then, solving equation 3 for $\theta_{r1}$ reveals that $\theta_{r1} = 2(0.511025) = 1.022049$. Next, equation 7 can be solved to determine the mold radius of curvature, which is R=2*2/1.022049. Thus, the mold radius of curvature is 3.913705.

The next step is to then solve for the second radius of curvature. The second arc length S2 is equal to the minor distance of W. Thus, we have the following:

Y=3 inches

W=1 inch

H=0.5 inches

S2=1 inch

Next for an initial guess for Newton's method of iteration used to first to calculate an angle, then a radius of curvature, equation [4] indicates that k=H/S2 or that k=0.5/1 or that k=0.50. Equation [5] indicates that x(0)=2*k, or 1.0. Applying Newton's method of iteration to equation 6 above results in the following:

$$x(1) = (1.0) - (\cos(1.0) + 0.5*1.0 - 1)/(-\sin(1.0) + 0.50),$$
which reduces to $$x(1) = 1.118026$$

By similar methods, the following table can be calculated:

$x(2) = 1.109188$ $x(3) = 1.109144$ $x(4) = 1.109144$

Then, solving equation 3 for $\theta_{r2}$ reveals that $\theta_{r2} = 2(1.109144) = 2.218288$. Next, equation 7 can be solved to determine the mold radius of curvature, which is R2=2*1/2.218288. Thus, the second radius of curvature R2 is 0.901596.

Figure 5D:
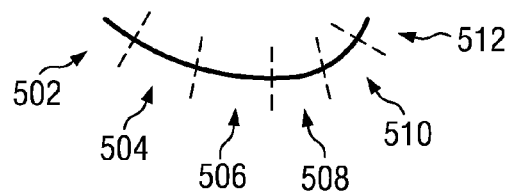
FIG. 5d is a side elevational view of an asymmetrical mold and resultant snack piece made by one embodiment of the present invention.

The junction where the first arc length and second arc length come together can be abrupt. Hence, it may be desirable to smooth out the mold by providing a plurality of arc lengths, each having a radius of curvature. FIG. 5d is a side elevational view of an asymmetrical mold and resultant snack piece made by one embodiment of the present invention. FIG. 5d depicts a mold having several arc lengths 502 504 506 508 510 512 that can achieve a gradual transition while matching the desired chip length and height. Further, such an embodiment can help to smooth out pinch points that can be created by placing widely varying mold radii adjacent one another. For example, in one embodiment, arc length 502 can have a mold radius of curvature that is less than the mold radius of curvature associated with the adjacent arc length 504. Similarly, the radius of curvature associated with arc length 504 can be smaller than the radius of curvature associated with arc length 506. Likewise the radius of curvature of arc length 512 can be less than the radius of curvature of arc length 510, which can be less than the radius of curvature of arc length 508. The more arc lengths that are used with a radius of curvature, the less abrupt the transitions within the mold can be. In one embodiment, the mold comprises a first end mold radius of curvature 502 and a second end mold radius of curvature 512 are substantially equal.

In another embodiment of the present invention, the mold can be designed so that the snack piece centroid corresponds to a relatively flat section substantially in the center section so that the vertical displacement between the snack piece centroid and the chip centerline is minimal. Such a configuration can lessen potential cumulative height difference potential despite the fact that the centerline of the chip and the product centroid are not the same. In such an embodiment of the invention, a symmetrical mold can be designed to accommodate a dough piece having an asymmetrical shape.

Figure 6A:
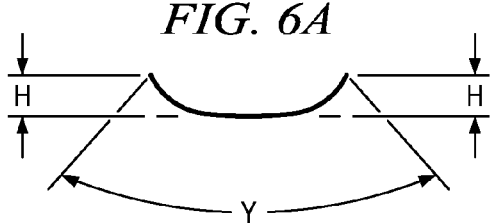
FIG. 6a is a side elevational view of a symmetrical mold and resultant snack piece made by one embodiment of the present invention.
Figure 6B:
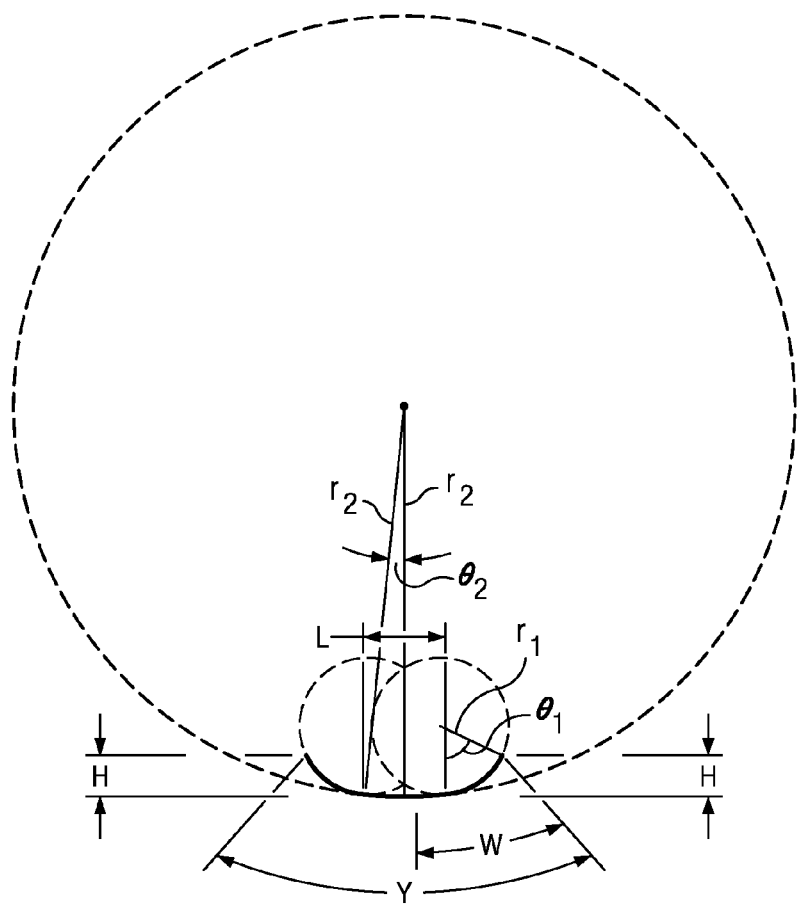
FIG. 6b is a side elevational view of a portion of FIG. 6a further depicting a first radius of curvature and a second radius of curvature.

FIG. 6*a* is a side elevational view of a symmetrical mold and resultant snack piece made by one embodiment of the present invention. FIG. 6*b* is a side elevational view of a portion of FIG. 6*a* further depicting a first radius of curvature and a second radius of curvature. The curvature suggested for the center section depends on the overall length of the snack piece and the proximity of the centroid to the snack piece midpoint. One advantage provided by this embodiment of the present invention is that the same infeed pattern of snack pieces fed into the fryer can be efficiently nested without reorientation by 180 degrees after frying because the mold pattern is symmetrical. Thus, an improved nesting efficiency can be achieved.

As shown, the FIG. 6*b* comprises known values of desired chip height H, total chip length Y, and minor distance W. With these known values, one skilled in the art can calculate the proper mold curvatures in an iterative process. It should be noted that different mathematical formulas than the ones shown above may be required based upon various snack piece shapes and the desired number and location of mold curvatures. In one embodiment, a desired chip length Y of 2.5 inches had a center section radius of curvature of between about 4 to about 5 inches. As the mold radius in the center section increases, the chip height H can increase. Thus, to keep chip height H constant as the radius of curvature of the center section increases the mold radius for the outside segments may need to be increased to offset any resultant chip height H increase.

It should be noted that various shapes can be used in accordance with the present invention and the shapes used are limited only by the imagination of those skilled in the art. For example, complex shapes can mimic the outline of a state, such as the state of Texas, or an animal, such as a cheetah, or other object.

A snack piece in accordance with the present invention comprises a plurality of vertices and each of the vertices have a substantially equal planar elevation, or height. For example, consider a snack piece made in accordance with one embodiment of the present invention having an axis of curvature and having a plurality of vertices. When the snack piece is resting upon a rigid, flat surface, each vertice will have a substantially equal distance or height from the vertice to the resting surface. Thus, the invention provides a method for making a stable, stacked snack piece configuration.

While the invention has been particularly shown and described with reference to a preferred embodiment, it will be understood by those skilled in the art that various changes in form and detail may be made therein without departing from the spirit and scope of the invention.

What is claimed is:

1. A method for making a stackable asymmetrical snack piece, said method comprising the steps of:
   a) providing a mold comprising:
      a first arc length having a first radii of curvature;
      at least one second arc length having a second radii of curvature, wherein said second radii of curvature is different than said first radii of curvature;
   b) registering an asymmetrical dough piece having a plurality of vertices with said mold such that each vertice has a substantially equal height when resting upon its centroid on a flat surface after step c);
   c) cooking said asymmetrical dough piece to make a molded snack piece, wherein said snack piece is asymmetrical about a balance line passing through its centroid, wherein said balance line is parallel to an axis of curvature of said snack piece and said centroid is located away from a centerline of said snack piece; and
   d) stacking said molded snack pieces.

2. The method of claim 1, wherein said mold is symmetrical.

3. The method of claim 1, wherein said mold is asymmetrical.

4. The method of claim 1, wherein said dough piece is substantially triangular.

5. The method of claim 1 wherein said mold comprises a first end and a second end wherein said first end and said second end each comprise a substantially equal radius of curvature.

* * * * *